Dec. 17, 1935.   R. P. BEESLEY   2,024,329
MEANS FOR LUBRICATING THE CAM SHAPED SURFACE OF THE BOLT OF A LOCK
Filed April 17, 1934   2 Sheets-Sheet 1
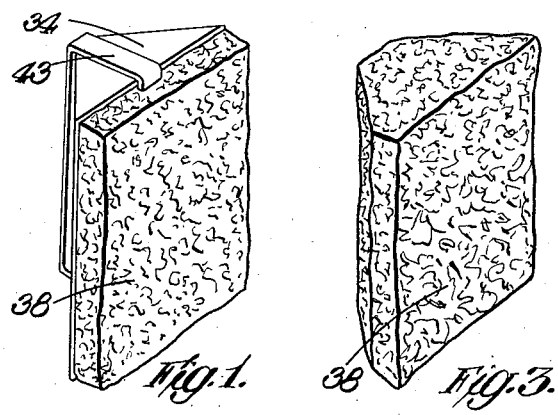
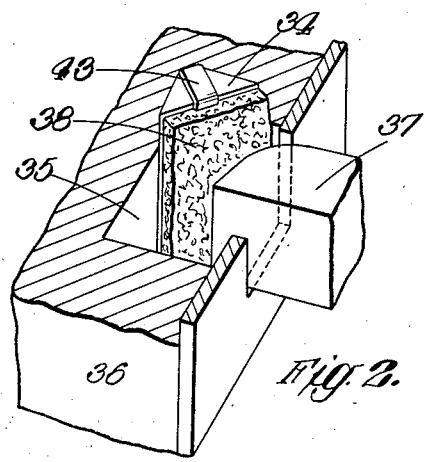
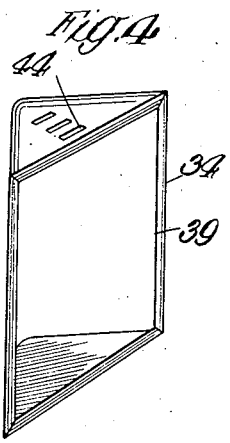
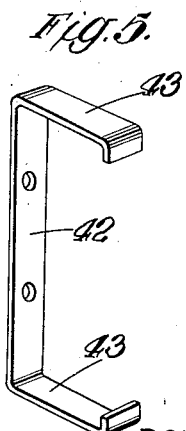
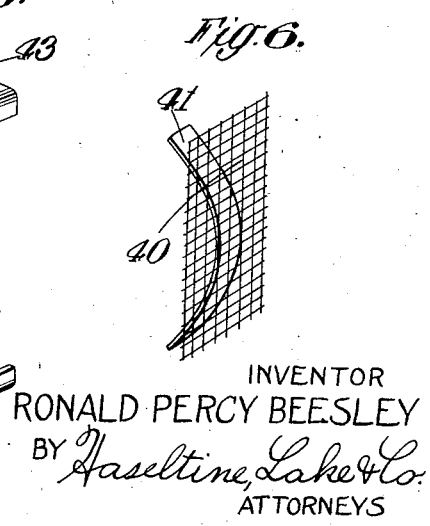
INVENTOR
RONALD PERCY BEESLEY
BY Haseltine, Lake & Co.
ATTORNEYS Dec. 17, 1935.    R. P. BEESLEY    2,024,329
MEANS FOR LUBRICATING THE CAM SHAPED SURFACE OF THE BOLT OF A LOCK
Filed April 17, 1934    2 Sheets-Sheet 2
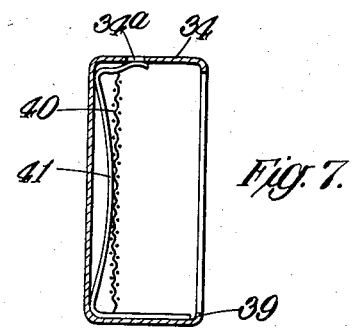
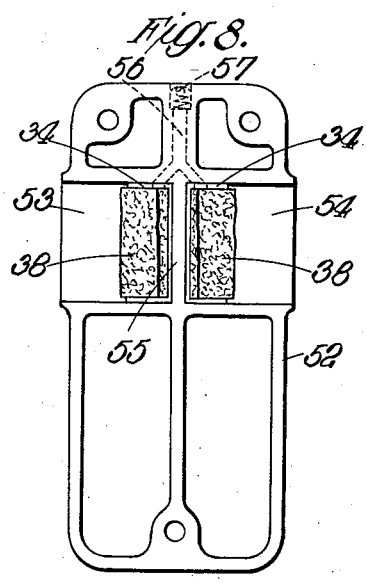
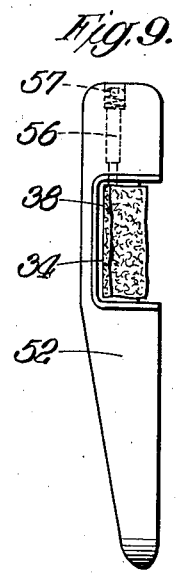
INVENTOR
RONALD PERCY BEESLEY
BY Haseltine, Lake & Co.
ATTORNEYS Patented Dec. 17, 1935

2,024,329

UNITED STATES PATENT OFFICE 2,024,329

MEANS FOR LUBRICATING THE CAM SHAPED SURFACE OF THE BOLT OF A LOCK

Ronald Percy Beesley, Catford, London, England, assignor to Cam Locks Limited, Catford, London, England, a British company Application April 17, 1934, Serial No. 720,973
In Great Britain May 29, 1933

16 Claims. (Cl. 70—16)

This invention relates to means for lubricating the cam shaped surface of the bolt of a lock.

It is the chief object of the present invention to provide improved means for the lubrication of such cam shaped surface whereby a supply of lubricant is available for application to the appropriate parts with a view to avoiding the periodic lubrication of the said parts from the exterior and also to prevent the unpleasant consequences of lubricant soiling the hands of the operator and also to prevent the leaking of the lubricant onto parts where it is not desired.

The invention consists in the novel features referred to in the claims appended hereto.

In order that the said invention may be clearly understood and readily carried into effect the same will now be more fully described with reference to the accompanying drawings, in which:—

Figure 1 is a perspective view of the appliance for lubricating the cam shaped surface of sliding bolts of locks;

Figure 2 is a perspective view illustrating the appliance shown in Figure 1 in position in the recess of a door jamb;

Figures 3, 4, 5, and 6 are detailed views of the appliance as shown in Figure 1;

Figure 7 is a vertical section through the container or reservoir shown in Figure 4 illustrating a modified arrangement;

Figure 8 is a rear view of a lock plate for application to a common door jamb illustrating the present invention as applied thereto;

Figure 9 is a side elevation of the plate shown in Figure 8.

In the embodiment of the invention shown in Figures 1 to 6 a container or reservoir 34 is employed of such dimensions as to be capable of fitting within the recess 35 in a door jamb 36 in which the bolt 37 of a lock projects. The container or reservoir 34 in the example shown is of substantially triangular shape in cross section so that it can conveniently fit into one corner of the recess 35. The container or reservoir 34 is filled or partially filled with a pad of felt or other absorbent material 38 which is held within the container or reservoir 34 by the gripping action of the turned over edges 39 of the container or reservoir.

As shown in Figure 3, the cross section of the pad of felt or other absorbent material is of substantially triangular shape to conform to the shape of the container or reservoir 34. The rear or apex end of the felt pad 38 preferably contacts with a piece of wire gauze or mesh 40 (Figure 6) disposed within the container or reservoir the gauze 40 being normally urged outwardly by a leaf spring 41 which engages the rear or apex end of the container or reservoir 34. The provision of the gauze 40 forms a space in the container or reservoir 34 for containing a supply of lubricant for absorption by the pad 38. The lubricant can be applied to the container or reservoir 34 through a suitably arranged filling aperture which may be controlled if desired by a ball or other valve, or alternatively, lubricant may be applied to the surface of the pad 38 or the pad 38 may be immersed in lubricant before insertion in the reservoir 34. Any surplus of lubricant in the pad 38 flows to the space at the rear of the container or reservoir 34 where it remains for absorption by the pad 38 from time to time. The container or reservoir 34 may be held in position in the recess 35 by means of a spring clip 42 (Figure 5). The spring clip is adapted to be secured by means of screws in the recess 35 the spring clip having arms 43 the ends of which are bent as shown to engage the upper and lower edges of the container or reservoir 34.

If desired the upper and lower surfaces of the container or reservoir 34 may have one or more recesses 44 those on the upper surface being shown in Figure 4 for engagement by the bent ends of the arms 43 of the spring clip 42 so as to enable the disposition of the container or reservoir 34 to be varied according to the position of the bolt 37 within the recess 35. The disposition of the container or reservoir and the pad of felt 38 is such that normally when the door is in a closed position the cam shaped surface of the bolt 37 is in contact with the pad 38; thus lubricant is applied to the cam shaped surface of the bolt 37.

In Figure 7 of the accompanying drawings the spring 41 is shaped so that it exerts the desired pressure on the wire mesh or gauze 40 and at the same time serves normally to close an oiling aperture 34a. The spring 41 at its upper end has an extension as shown which extension is in proximity to the oiling aperture 34a and has an arch shaped or partly spherical portion which contacts with the surface of the aperture 34a on the inside of the reservoir or container 34. The spring 41 is held in position by the provision of a horizontal lower portion as shown in Figure 7 which is disposed between the apex end of the container or reservoir 34 and the turned over edge 39.

Figures 8 and 9 illustrate the invention as applied to a lock plate 52 which is adapted to be applied to a common door jamb such as the jamb against which adjacent doors of a motor vehicle abut. As shown the plate 52 is provided with a pair of oppositely disposed recesses 53 and 54 which are formed by a web 55. A pair of reservoirs or containers 34 are disposed in the corners of the recesses 53 adjacent the web 55 the containers or reservoirs being oppositely disposed so as to contact with the cam shaped surfaces of the bolts of the lock when the two doors are in position against the common jamb. The reservoirs or containers 34 are supplied with lubricant through a common oiling aperture 56 which as shown is branched at its lower end so that lubricant is supplied simultaneously to the pair of containers or reservoirs 34. The open end of the duct 56 is normally closed by a spring pressed ball valve 57. The plate 52 may be made from a mouldable substance such as a phenolic condensation product or similar material or alternatively, the plate may be cast in or stamped from metals. The containers or reservoirs may be moulded during the moulding operation of the said plate or alternatively the containers or reservoirs may be made of thin metal as described in connection with Figure 4.

With the lubricating means according to the invention it is preferred that the lubricant employed be a non-evaporating oil and one which has seeping qualities.

What I claim and desire to secure by Letters Patent of the United States is:—

1. Means for lubricating the cam shaped surface of the bolt of a lock comprising a reservoir, a pad of absorbent material in said reservoir, the rear surface of said pad being spaced from an adjacent surface of said reservoir forming a space for the retention of a supply of lubricant for absorption by said pad.

2. Means for lubricating the cam shaped surface of the bolt of a lock comprising a reservoir of a substantially triangular shape in cross section for fitting into the corner of a bolt recess, a pad of absorbent material in said reservoir, said absorbent material being of a substantially triangular shape in cross section.

3. Means as in claim 1 wherein a spring is provided between the rear of said reservoir and the absorbent material for compressing the latter.

4. Means as in claim 1 wherein a spring is provided at the rear of said reservoir, the spring compressing the said absorbent material through the medium of a piece of reticulated material engaging the rear of said pad.

5. Means as in claim 2, wherein a spring is provided between the rear of said reservoir and the absorbent material for compressing the latter.

6. Means as in claim 2, wherein a spring is provided at the rear of said reservoir, the spring compressing the said absorbent material through the medium of a piece of reticulated material engaging the rear of said pad.

7. Means for lubricating the cam shaped surface of the bolt of a lock, comprising a casing of a substantially triangular shape in cross section for fitting into the corner of a bolt recess, a pad of absorbent material in said casing, the rear surface of said pad being spaced apart from an adjacent surface of said casing forming a space for the retention of a supply of lubricant for absorption by said pad.

8. Means for lubricating the cam shaped surface of the bolt of a lock comprising a casing adapted to fit into the corner of a bolt recess, said casing comprising walls forming an opening, a pad of absorbent material in said opening and serving to close said opening to prevent a free flow of lubricant from said casing.

9. Means as in claim 7, wherein the edges of said casing are inwardly directed towards the centre of the casing for the purpose of gripping the pad of absorbent material.

10. Means for lubricating the cam shaped surface of the bolt of a lock comprising a reservoir for holding a supply of lubricant and adapted to fit into a recess for the said bolt, the reservoir having a pad of absorbent material with which the cam shaped surface of the bolt can contact, a piece of wire mesh at the rear of said pad and a leaf spring for pressing said wire mesh into engagement with the said pad.

11. Means for lubricating the cam shaped surface of the bolt of a lock comprising a casing of a substantially triangular shape in cross section for fitting into the corner of a bolt recess, a pad of absorbent material in said casing, and a clip device adapted to engage the surface of said casing to hold said casing in the bolt recess.

12. Means for lubricating the cam shaped surface of the bolt of a lock comprising a reservoir for receiving or holding a supply of lubricant and adapted to fit within a recess for the said bolt, a pad of absorbent material in said reservoir with which the cam shaped surface of said bolt can contact, a clip for holding said reservoir in said recess and means to enable the reservoir to be adjusted relatively to said recess.

13. Means as in claim 12, wherein the means for enabling the reservoir to be adjusted comprise a plurality of recesses on said reservoir with which engage ends of the said clip.

14. Means for lubricating the cam shaped surface of the bolt of a lock comprising a reservoir, a pad of absorbent material in said reservoir, a leaf spring at the rear of said reservoir for compressing said pad, an oiling aperture in said reservoir and an extension on said leaf spring projecting into proximity to said oiling aperture for normally closing said aperture.

15. Means for lubricating the cam shaped surfaces of the bolts of locks comprising a lock plate for application to a common door jamb, a pair of oppositely disposed recesses in said plate, reservoirs in said recesses for receiving or holding a supply of lubricant, the said reservoirs each having a pad of absorbent material with which the cam shaped surfaces of said bolts can contact.

16. Means as in claim 15, wherein the said plate is provided with a duct for the purpose of conveying lubricant simultaneously to said reservoirs.

RONALD PERCY BEESLEY.